(12) United States Patent
Sirén

(10) Patent No.: US 7,088,531 B2
(45) Date of Patent: Aug. 8, 2006

(54) DEVICE INCLUDING COLOR SEPARATION PRISM

(75) Inventor: Kari Sirén, Launonen (FI)

(73) Assignee: TVI Vision Oy, Helsinki (FI)

( * ) Notice: Subject to any disclaimer, the term of this patent is extended or adjusted under 35 U.S.C. 154(b) by 0 days.

(21) Appl. No.: 10/513,287

(22) PCT Filed: May 16, 2003

(86) PCT No.: PCT/FI03/00380

§ 371 (c)(1),
(2), (4) Date: Oct. 29, 2004

(87) PCT Pub. No.: WO03/098285

PCT Pub. Date: Nov. 27, 2003

(65) Prior Publication Data

US 2005/0180031 A1    Aug. 18, 2005

(30) Foreign Application Priority Data

May 17, 2002    (FI) .................................. 20020935

(51) Int. Cl.
*G02B 5/04*    (2006.01)
(52) U.S. Cl. ....................................... 359/834; 359/638
(58) Field of Classification Search ................. 359/834
See application file for complete search history.

(56) References Cited

U.S. PATENT DOCUMENTS

| | | | |
|---|---|---|---|
| 4,262,305 A | 4/1981 | Sekiguchi et al. | |
| 4,268,119 A | 5/1981 | Hartmann | |
| 4,916,529 A | 4/1990 | Yamamoto et al. | |
| 5,696,610 A | 12/1997 | Imot | |
| 6,342,980 B1 | 1/2002 | Omuro | |
| 6,542,193 B1 * | 4/2003 | Yoshikawa et al. | ......... 359/834 |

FOREIGN PATENT DOCUMENTS

| JP | 5-244-613 | 9/1993 |
|---|---|---|
| JP | 2000-338313 | 12/2000 |
| JP | 2001-242311 | 9/2001 |
| JP | 2001-318211 | 11/2001 |
| WO | WO-00/67488 A1 | 5/1981 |

* cited by examiner

*Primary Examiner*—Euncha P. Cherry
(74) *Attorney, Agent, or Firm*—Darby & Darby

(57) ABSTRACT

The invention relates to a device including a color separation prism, comprising at least two image sensors whose sensor surfaces are substantially of the shape of a rectangular parallelogram, and a color separation prism whose front surface of a functional part is planar and substantially of the shape of a rectangular parallelogram, whereby the front surface of the functional part of the color separation prism has a first side length and a second side length perpendicular thereto. In the device of the invention, the first side length of the front surface of the functional part of the color separation prism is substantially shorter than the second side length.

15 Claims, 2 Drawing Sheets

DEVICE INCLUDING COLOR SEPARATION PRISM

BACKGROUND OF THE INVENTION

The invention relates to devices equipped with a colour prism, such as colour line scan cameras, colour scanners and other such optoelectronic devices.

Colour line scan cameras are used in industry and in official applications necessitating a high frame rate, high-quality colour separation and a high-resolution image. Colour line scan cameras employ two basic technologies for producing colour separation. In the first method, different wavelength ranges are provided with separate sensors whose shape and order vary but which are characterized in that colour separation is carried out in the actual sensor element, typically using filters. In devices according to the first method, sensors of different wavelength ranges are usually positioned in closely-spaced rows of their own. A typical device according to the first method is provided with adjacent rows of sensors for blue, green and red colour channels. The second method is based on a colour separation prism which, utilizing selectively reflecting surfaces and total reflection, separates each colour onto an image surface of its own. Line image sensors placed on these image surfaces allow to be located on top of one another optically.

The problem with the devices according to the above-described first method, wherein colour separation is carried out in the actual sensor element, is inaccurate colour registration since images of different colours are not stored at exactly the same point in time from the same source. A further problem is that images of different colours are not stored from the same direction nor at the same optical distance.

A colour line scan camera equipped with a colour prism enables an image of each colour of a certain object to be stored at the same moment, from the same direction and at the same optical distance, but since in this method in addition to air, glass of the prism is also located between an objective lens and an image sensor, optical characteristics deteriorate by a factor which depends on the length of a distance travelled by light in the glass. The colour separation prism deteriorates the optical characteristics of a conventional objective lens because conventional objective lenses are designed assuming that the medium in front of the image surface is air. Attempts have been made to solve the problem by providing colour line scan cameras with objective lenses to enable characteristics deteriorating the image quality of the prism to be reduced. This method enables quite good results to be achieved when an objective lens is designed for a particular application and when the f-number of the objective lens is allowed to deteriorate. A problem with this method is that the custom-made objective lens makes the colour line scan camera much more expensive. The colour line scan camera is often a part of a more comprehensive computer vision system, in which case using the above-disclosed method also makes the entire computer vision system more expensive since a deteriorated f-number requires more efficient lightning.

In addition to colour line scan cameras, the above-described prior art problems also relate to all other corresponding opto-electronic devices, such as colour scanners.

BRIEF DESCRIPTION OF THE INVENTION

An object of the invention is to provide a device which forms a line-like image and which is equipped with a colour separation prism, wherein a distance travelled by light in the material of the prism is shorter than that in known corresponding devices, and whose image quality is better due to the shorter distance for light to travel. The object of the invention is achieved by a device which is characterized by what has been disclosed in the independent claim. Preferred embodiments of the invention are disclosed in the dependent claims.

The idea underlying the invention is that the distance travelled by light in the material of a colour separation prism is reduced by shaping the prism in a novel manner. Advantages of the device of the invention which forms a line-like image include better optical characteristics as compared to those of a known device which forms a line-like image but includes no optics for reducing harmful effects caused by a prism, and a lower price as compared to that of a known device which forms a line-like image and includes optics for reducing harmful effects caused by a prism.

BRIEF DESCRIPTION OF THE DRAWINGS

The invention is now described in closer detail with reference to the accompanying drawings, in which.

DETAILED DESCRIPTION OF THE INVENTION

Figure 1:
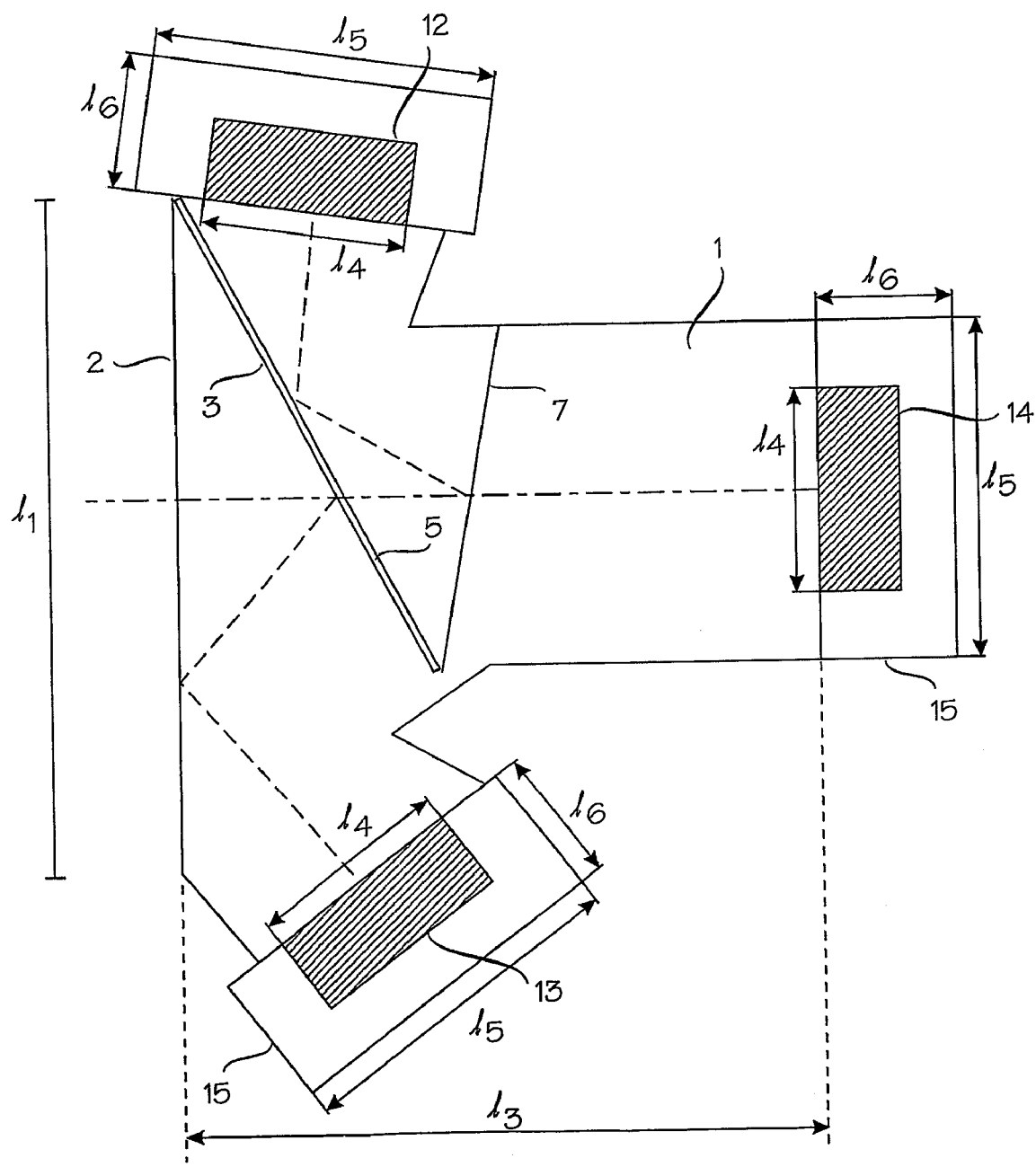
FIG. 1 is a cross-sectional view showing a colour separation prism of a device according to an embodiment of the invention and image sensors fastened thereto in a plane in the direction of which a blue, a green and a red component of a ray of light hitting the prism in a direction of an optical axis progress in the material of the prism.

FIG. 1 describes a situation wherein a prism 1 according to an embodiment of the invention is used for separating light hitting the particular prism into a blue, red and a green component. Blue light is conveyed to a blue light image sensor 13 by means of reflection taking place from a surface 3 reflecting the blue light and total reflection taking place from a front surface 2 of the prism. Red light is conveyed to a red light image sensor 12 by means of reflection taking place from a surface 7 reflecting the red light and total reflection caused by an air gap 5. Green light goes straight through the prism 1 to a green light image sensor 14.

The device of the invention comprises two or more image sensors 12, 13 and 14, whose sensor surfaces are substantially of the shape of a rectangular parallelogram, and a colour separation prism 1. A front surface 2 of a functional part of the colour separation prism 1, i.e. the surface first hit by the light arriving at the prism 1, is planar and substantially of the shape of a rectangular parallelogram, in which case the front surface 2 of the functional part of the colour separation prism has a first side length $l_1$ and a second side length $l_2$ perpendicular thereto. The device of the invention is characterized in that the first side length $l_1$ of the front surface of the functional part of the colour separation prism is substantially shorter than the second side length $l_2$.

Figure 2:
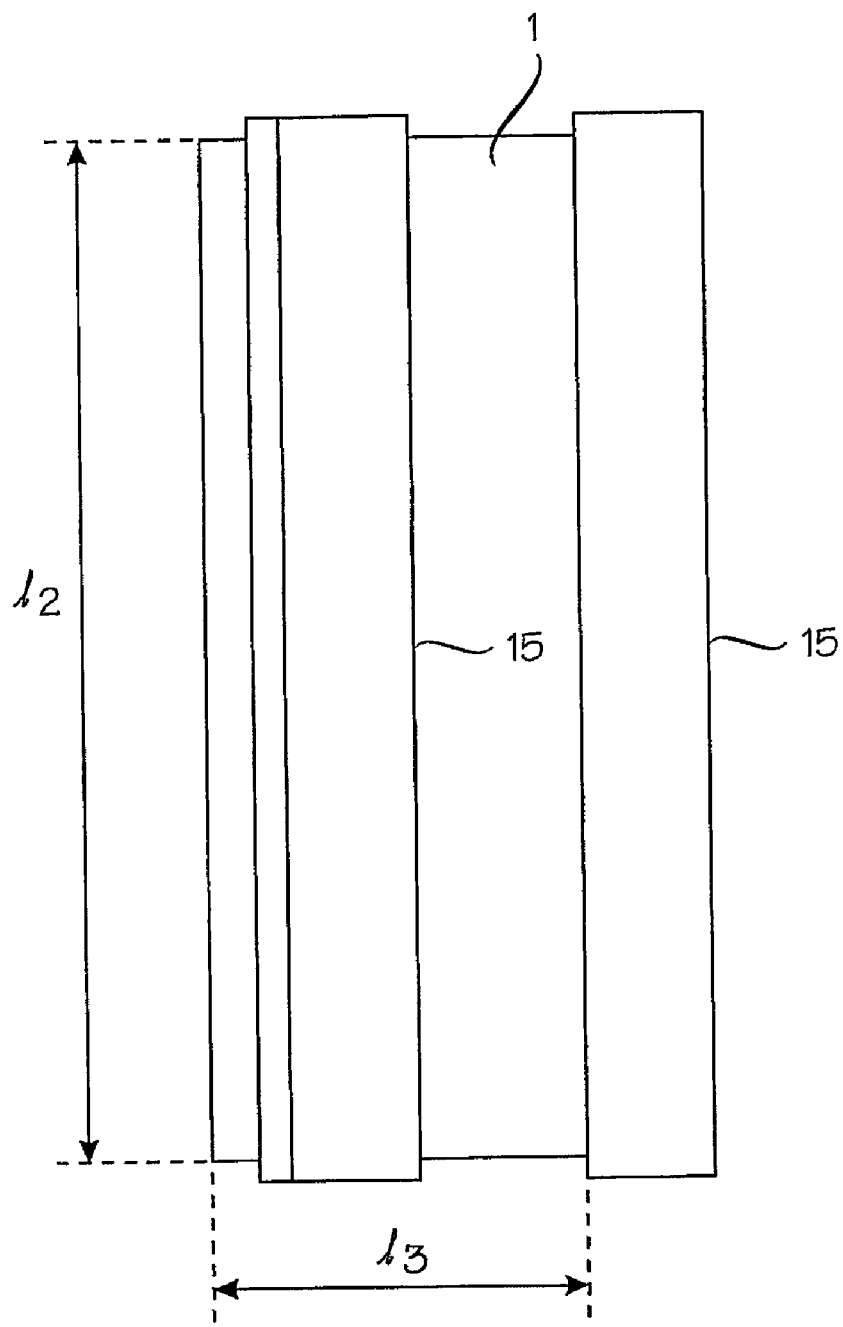
FIG. 2 shows the colour separation prism of FIG. 1 as seen in a direction perpendicular to the direction of view and the optical axis of FIG. 1.

Since the colour separation prism is preferably shaped such that the components of light hitting the prism to be conveyed to different image sensors, the components thus being separated using the colour separation prism, travel a distance of equal length in the material of the prism, the shaping in accordance with the invention of the front surface of the functional part of the prism affects other dimensions of the prism as well. In the colour separation prism of FIGS. 1 and 2, for example, which divides the incoming light into three components, the shaping in accordance with the invention of the front surface 2 of the functional part of the colour separation prism 1, wherein the first side length $l_1$ of the front surface is thus substantially shorter than the second side length $l_2$, affects such that a dimension $l_3$ in depth of the prism also decreases as compared to a prior art solution. The distance travelled by light in the material of the prism 1 decreases by the same factor as used for decreasing the width $l_1$ of the front surface 2 of the functional part of the prism, i.e. by decreasing, for example, the width of the front surface of the functional part of the prism by half also enables the distance travelled by light in the material of the prism to be halved, etc.

Known prisms are designed for area sensors; therefore, they are large also in the transverse direction of line image sensors. Using the known prisms in devices which form a line-like image causes the light hitting the image sensors of a device to travel an unnecessarily long distance in the material of the prism, which means that the quality of the image deteriorates as compared to the solution of the invention.

The reason why devices forming a line-like image enable a novel prism to be used lies in the way in which light travels from a lens to an elongated image sensor. At the lens, light information supplied to the sensor travels along a path whose cross-section is of a similar shape to that of the lens, i.e. the cross-section of the above-mentioned path for a normal round lens, for example, is circular. The cross-section of the path used by the rays of light hitting a particular image sensor reduces as the light travels from the lens to the image sensor such that the cross-section is eventually exactly of the shape of the image sensor, i.e. line-like, being substantially elliptical between the lens and the image sensor. The present invention utilizes the fact that the closer the image sensor, the narrower the area necessitated by the colour separation prism.

In the device of the invention, a ratio $l_1:l_2$ of the sides of the front surface 2 of the functional part of the colour separation prism 1 may be e.g. 1:5, 1:10, 1:20 or 1:30. In the colour line scan cameras according to the present invention, for example, the ratio of the sides of the front surface of the functional part of the colour separation prism will probably often be about 1:20.

No accurate minimum or maximum limit can be determined for the ratio of the sides of the front surface 2 of the functional part of the colour separation prism 1 in accordance with the device of the invention. However, it is obvious that advantages achieved by the structure of the invention diminish when the ratio of the sides draws too near to the corresponding ratio of known colour separation prisms. Similarly, it is obvious that the colour separation prism 1 cannot be made extremely narrow but matters relating to production and material technologies set certain restrictions.

It is obvious that in addition to the distance travelled by light in the material of the colour separation prism 1, the quality of image to be achieved is also affected by the size of image elements of the image sensors 12, 13 and 14 to be used. This means e.g. that when image sensors having a certain image element size are used, a limit value can be calculated for the "thickness" of the prism, and selecting a prism thinner than that no longer improves the image quality in practice.

In prior art devices, each image sensor 12, 13 and 14 is usually enclosed in a separate housing 15 of its own, the housing having a width $l_5$ in a direction parallel to a sensor surface, and a depth $l_6$ perpendicular to a part of the prism to which the sensor surface is connected, in which case the width $l_5$ is larger than a width $l_4$ of the sensor surface. The width $l_4$ of the sensor surface herein refers to a length of the side of the sensor surface in the direction of which objects having a direction parallel to the width $l_1$ of the front surface of the prism become produced onto the sensor surface. The width $l_5$ of the housing of the image sensor is parallel to the width $l_4$ of the sensor surface.

In the prior art devices, the above-described solution wherein each of the image sensors 12, 13 and 14 is enclosed separately works perfectly well. On certain conditions, the solution may also be used in devices according to the present invention. However, in situations wherein a colour separation prism 1 whose front surface 2 of the functional part is extremely elongated is to be used in a device of a relatively small size, a situation sometimes occurs wherein the dimensions of the housings 15 of the image sensors 12, 13 and 14 restrict selection of the ratios of the sides of the front surface of the functional part of the prism. In the case of the colour separation prism 1 according to FIG. 1, equipped with three image sensors, such a situation occurs when the dimensions of the prism are reduced to such an extent that the edges of the housings 15 of the image sensors 12 and 13 come into contact with a side in a direction parallel with the direction $l_3$ in depth of the prism 1, or the housing 15 of the image sensor 14.

In order for the dimensions of the housings 15 of the image sensors 12, 13 and 14 not to restrict the dimensioning of the front surface 2 of the functional part of the prism 1, in some situations it is preferable to use a solution according to an embodiment of the present invention wherein two or more of the image sensors of a device are encased into the same housing. In many cases it is appropriate to encase all image sensors of the device into the same housing but it is also possible to use a solution wherein some of the image sensors of the device are encased separately while some are located in the same housing, together with one or more other image sensors. The image sensors may also be partly or completely non-encased. It is also possible to encase the image sensors into the same housing as the prism, which provides an extremely compact structure.

Depending on the purpose of use, the device of the invention may include two, three or more image sensors. The wavelength of light indicated by the image sensors used is by no means restricted to the conventional blue, green and red, nor even to visible light, i.e. when desired, the device of the invention may also be arranged for use within a wavelength range located partly or completely outside the visible light. It is further to be noted that the prism 1 to be used in the device of the invention does not have to be made of a glass material but any other material having suitable optical characteristics may be used.

For the sake of simplicity, it is assumed in the above description as well as in the accompanying drawings that the widths $l_5$ and the depths $l_6$ of the housings 15 of the image sensors 12, 13 and 14 as well as the widths $l_4$ of the sensor surfaces of the image sensors are the same in all image sensors of the same device. It is, however, completely possible to construct a device according to the present invention wherein the dimensions of the housings of different image sensors and the dimensions of different sensor surfaces differ from each other. The dimensions of the housings 15 in particular do not have to be mutually identical for different image sensors 12, 13 and 14 although, for practical reasons, this usually seems to be the case in solutions wherein each image sensor 12, 13 and 14 is encased separately. Neither do the dimensions of the sensor surfaces of the image sensors necessarily have to be mutually identical although this usually is the case due to the requirements set by the image shape produced by the device for the shape of the sensor surfaces to be used and due to the fact that the components of different colour of light are usually to travel a distance of an equal length in the material of the prism.

Although certain shapes of the components, such as the front surface 2 of the functional part of the colour prism 1 and the sensor surfaces of the image sensors 12, 13 and 14, have been discussed above by assuming that they are rectangular parallelograms in shape, it is obvious that the present invention also covers solutions wherein the particular shapes slightly differ from that of a rectangular parallelogram. The invention thus covers e.g. devices wherein corners of the sensor surface of one or more image sensors or the front surface of the functional part of the prism have been rounded, as well as other corresponding variations.

It is obvious to one skilled in the art that the basic idea of the invention can be implemented in many different ways. The invention and its embodiments are thus not restricted to the above examples but they may vary within the scope of the claims.

The invention claimed is:

1. A device including a colour separation prism, comprising at least two image sensors whose sensor surfaces are substantially of the shape of a rectangular parallelogram, and a colour separation prism whose front surface of a functional part is planar and substantially of the shape of a rectangular parallelogram, whereby the front surface of the functional part of the colour separation prism has a first side length and a second side length perpendicular thereto, wherein the first side length of the front surface of the functional part of the colour separation prism is substantially shorter than the second side length.

2. A device as claimed in claim 1, wherein a ratio of the first side length of the front surface of the functional part of the colour separation prism to the second side length is at least 1:5.

3. A device as claimed in claim 2, wherein it is arranged to operate at wavelengths of visible light.

4. A device as claimed in claim 3, wherein it comprises three image sensors, the first being arranged to indicate blue light, the second being arranged to indicate green light and the third being arranged to indicate red light.

5. A device as claimed in claim 1, wherein it is arranged to operate at wavelengths of visible light.

6. A device as claimed in claim 5, wherein it comprises three image sensors, the first being arranged to indicate blue light, the second being arranged to indicate green light and the third being arranged to indicate red light.

7. A device as claimed in claim 1, wherein the colour separation prism is made of a glass material.

8. A device as claimed in claim 2, further comprising a housing into which the colour separation prism and the at least two image sensors have been integrated.

9. A device as claimed in claim 2, wherein the ratio of the first side length of the front surface of the functional part of the colour separation prism to the second side length is about 1:20.

10. A device as claimed in claim 9, wherein it is arranged to operate at wavelengths of visible light.

11. A device as claimed in claim 9, further comprising a housing into which the colour separation prism and the at least two image sensors have been integrated.

12. A device as claimed in claim 10, wherein it comprises three image sensors, the first being arranged to indicate blue light, the second being arranged to indicate green light and the third being arranged to indicate red light.

13. A device as claimed in claim 1, further comprising a housing into which the colour separation prism and the at least two image sensors have been integrated.

14. A device as claimed in claim 13, wherein it is arranged to operate at wavelengths of visible light.

15. A device as claimed in claim 14, wherein it comprises three image sensors, the first being arranged to indicate blue light, the second being arranged to indicate green light and the third being arranged to indicate red light.

* * * * *

UNITED STATES PATENT AND TRADEMARK OFFICE
CERTIFICATE OF CORRECTION

PATENT NO. : 7,088,531 B2  
APPLICATION NO. : 10/513287  
DATED : August 8, 2006  
INVENTOR(S) : Kari Sirén Page 1 of 1

It is certified that error appears in the above-identified patent and that said Letters Patent is hereby corrected as shown below:

On the title page, under item [86]

Please delete "October 29, 2004" and substitute -- December 28, 2004 --.

The Inventor's Place of Residence is incorrect:

Please delete "Kari Siren, Launonen (FI)" and substitute -- Kari Siren, Espoo (FI) --.

Signed and Sealed this

Fifth Day of December, 2006

JON W. DUDAS  
*Director of the United States Patent and Trademark Office*